(12) United States Patent
Matsuda et al.

(10) Patent No.: US 12,411,040 B2
(45) Date of Patent: Sep. 9, 2025

(54) DISTANCE CORRECTION DEVICE, PROCESSING DEVICE, SENSOR DEVICE, DISTANCE CORRECTION METHOD, AND RECORDING MEDIUM

(71) Applicant: NEC Corporation, Tokyo (JP)

(72) Inventors: Yuma Matsuda, Tokyo (JP); Tomoyuki Hino, Tokyo (JP)

(73) Assignee: NEC CORPORATION, Tokyo (JP)

( * ) Notice: Subject to any disclaimer, the term of this patent is extended or adjusted under 35 U.S.C. 154(b) by 322 days.

(21) Appl. No.: 18/033,017

(22) PCT Filed: Nov. 10, 2020

(86) PCT No.: PCT/JP2020/041814
§ 371 (c)(1),
(2) Date: Apr. 20, 2023

(87) PCT Pub. No.: WO2022/101959
PCT Pub. Date: May 19, 2022

(65) Prior Publication Data
US 2023/0384149 A1   Nov. 30, 2023

(51) Int. Cl.
*G01H 9/00* (2006.01)
*G01B 11/00* (2006.01)
*G08G 1/04* (2006.01)

(52) U.S. Cl.
CPC .......... *G01H 9/004* (2013.01); *G01B 11/00* (2013.01); *G01H 9/00* (2013.01); *G08G 1/04* (2013.01)

(58) Field of Classification Search
CPC ...... G08G 1/04; G08G 1/0116; G08G 1/0125; G01H 9/004; G01H 9/00; G01B 11/00
See application file for complete search history.

(56) References Cited

U.S. PATENT DOCUMENTS

2018/0342156 A1   11/2018   Martin et al.
2019/0120663 A1   4/2019   Suzaki
(Continued)

FOREIGN PATENT DOCUMENTS

CN   103134432 A   *   6/2013   ............ G01B 11/02
JP   2018-114790 A       7/2018
(Continued)

OTHER PUBLICATIONS

International Search Report for PCT Application No. PCT/JP2020/041814, mailed on Jan. 19, 2021.
(Continued)

*Primary Examiner* — Benjamin R Schmitt
(74) *Attorney, Agent, or Firm* — Sughrue Mion, PLLC

(57) ABSTRACT

In order to facilitate accuracy improvement in identification of a position of vibration on a road caused by a vehicle and detected through an optical cable, this distance correction device: derives, from vibration data for each optical fiber distance detected through an optical fiber installed along the road on which the vehicle travels, a first vibration value indicating the magnitude of vibration within a prescribed frequency range for the optical fiber distance; derives, from the first vibration value, a bridge optical fiber distance which is an optical fiber distance to a prescribed position of the optical fiber installed at a bridge; and corrects, from the bridge optical fiber distance and a road distance which is a distance, along the road, from a reference point to a bridge optical fiber position, the optical distance within a prescribed range so as to be closer to the road distance.

20 Claims, 11 Drawing Sheets

(56) References Cited

U.S. PATENT DOCUMENTS

2021/0293606 A1* 9/2021 Kobayashi .............. G08G 1/02
2022/0057255 A1   2/2022 Hino et al.

FOREIGN PATENT DOCUMENTS

| WO | 2017/072505 A1 | 5/2017 |
| WO | 2017/179431 A1 | 10/2017 |
| WO | 2020/178976 A1 | 9/2020 |

OTHER PUBLICATIONS

English translation of Written opinion for PCT Application No. PCT/JP2020/041814, mailed on Jan. 19, 2021.

* cited by examiner

Fig.2

| ROAD | TRAVELLING OF VEHICLE | HIGH FREQUENCY RANGE AMPLITUDE | LOW FREQUENCY RANGE AMPLITUDE |
|---|---|---|---|
| BRIDGE | PRESENT | SMALL | LARGE |
| BRIDGE | ABSENT | SMALL | SMALL |
| OTHER THAN BRIDGE | PRESENT | LARGE | LARGE |
| OTHER THAN BRIDGE | ABSENT | SMALL | SMALL |

DISTANCE CORRECTION DEVICE, PROCESSING DEVICE, SENSOR DEVICE, DISTANCE CORRECTION METHOD, AND RECORDING MEDIUM

This application is a National Stage Entry of PCT/JP2020/041814 filed on Nov. 10, 2020, the contents of all of which are incorporated herein by reference, in their entirety.

TECHNICAL FIELD

The present invention relates to a device that detects vibration by using an optical fiber.

BACKGROUND ART

A traffic status of a vehicle is acquired based on vibration detected by an optical fiber of an optical cable laid along a traffic track of the vehicle. PTL 1, for example, discloses a light source that emits laser light to an optical cable laid along a railroad track, and a railroad control system that detects scattering light in the optical cable, analyzes a frequency, detects a train position, and controls a railroad-related facility.

By applying the method of PTL 1, a traffic status of a vehicle traveling on a road is able to be acquired based on vibration detected by an optical cable laid along the road. Further, the traffic status of the vehicle may be associated with a length (hereinafter, referred to as an "optical cable distance") of the optical cable from a device that acquires vibration.

CITATION LIST

Patent Literature

PTL 1: Japanese Unexamined Patent Application Publication No. 2018-114790

SUMMARY OF INVENTION

Technical Problem

However, an optical cable laid along a road is not always laid along the road correctly, and generally has excess length and flexure. In such a case, a gap is generated between an optical cable distance and a distance (road distance) along a road. When a gap is present between the optical cable distance and the road distance, accuracy of identifying a position where vibration is generated by a vehicle decreases.

Therefore, in order to associate a traffic status of a vehicle with a road distance, work for associating an optical cable distance with the road distance is required. However, in general, such work is burdensome and not easily done. The reason is that, in order to perform the work, it is necessary to refer to a plurality of pieces of data such as structure information of a road and map information.

An object of the present invention is to provide a distance correction device and the like that facilitate improvement of accuracy of identifying a position, on a road, of vibration caused by a vehicle and detected by an optical cable.

Solution to Problem

A distance correction device according to the present invention includes: a vibration value derivation unit that derives, from vibration data being data representing magnitude of vibration detected by an optical fiber installed along a road on which a vehicle travels, for each optical fiber distance being a length from a reference point of the optical fiber, a first vibration value being a value representing magnitude of vibration in a first frequency range being a predetermined frequency range for each of the optical fiber distances; a bridge optical fiber distance derivation unit that derives, from the first vibration value, a bridge optical fiber distance being the optical fiber distance from the reference point to a bridge optical fiber position being a predetermined position of the optical fiber installed on a bridge; and a distance correction unit that corrects, based on the bridge optical fiber distance and a road distance being a distance along the road from the reference point to the bridge optical fiber position, the optical fiber distance in a predetermined range in such a way as to approach the road distance.

Advantageous Effects of Invention

The distance correction device and the like according to the present invention facilitate improvement of accuracy of identifying a position, on a road, of vibration caused by a vehicle and detected by an optical cable.

BRIEF DESCRIPTION OF DRAWINGS

FIG. 2 is a diagram illustrating a difference in characteristics of vibration data.

EXAMPLE EMBODIMENT

A sensor device according to the present example embodiment derives an optical fiber distance of a bridge, by using a fact that there is a difference in vibration data detected by an optical fiber between an optical cable laid on a bridge and an optical cable laid in another portion of a road. The sensor device executes processing of causing, based on a road distance of a bridge on map data and an optical fiber distance of the bridge, each optical fiber distance to the bridge to approach the road distance. According to the present example embodiment, it is assumed that a matter that an optical fiber distance is caused to approach the road distance is referred to as "correction".

Figure 1:
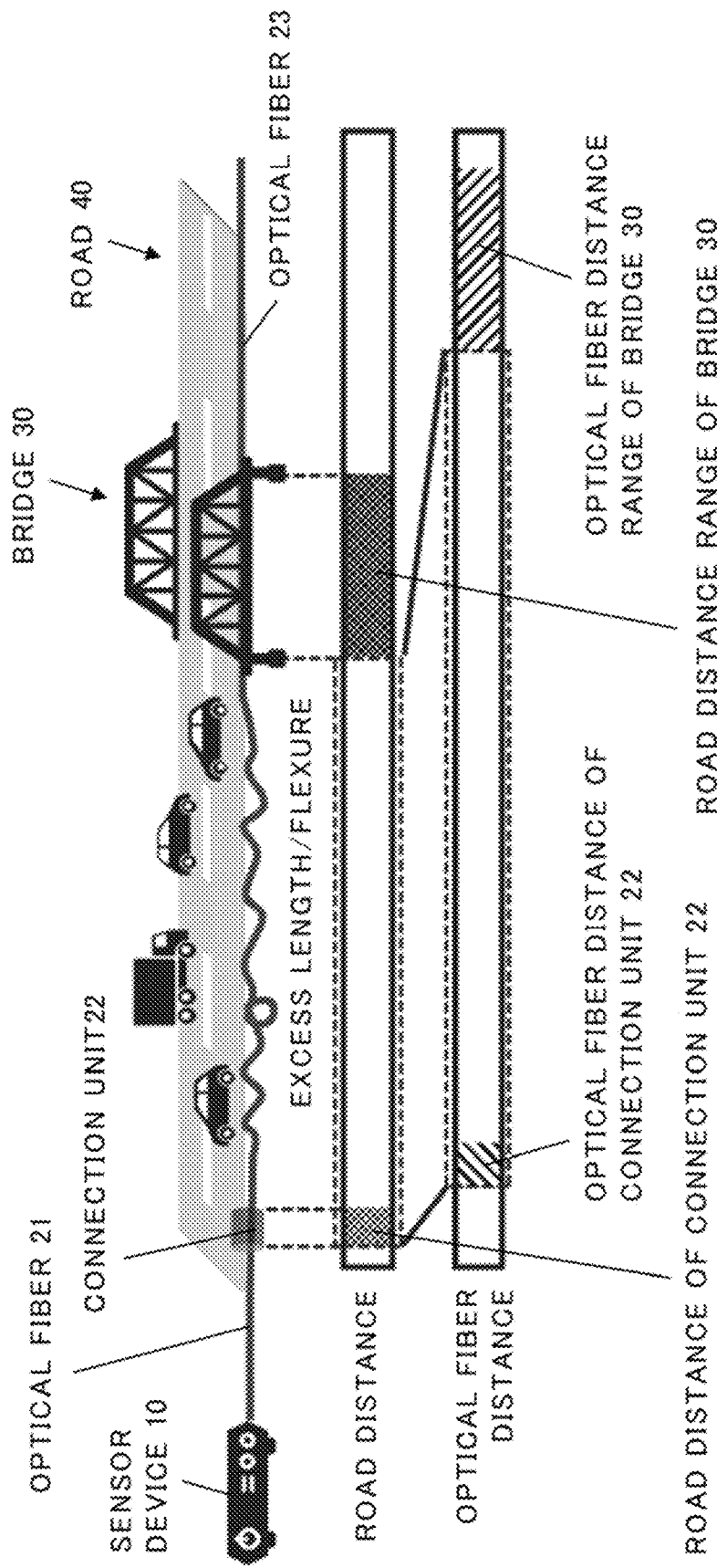
FIG. 1 is an image diagram illustrating an outline of a distance correction method according to the present example embodiment.

FIG. 1 is an image diagram illustrating an outline of a distance correction method according to the present example embodiment. The correction indicates that an optical fiber distance in vibration data is caused to approach a road distance.

An optical fiber 23 is included in an optical cable (not illustrated) laid in a road 40. The optical fiber 23 has excess length and flexure due to excess length and flexure of the optical cable.

An optical fiber 21 is an optical fiber included in an optical cable between a sensor device 10 and a connection unit 22. The optical fiber 21 is connected to the optical fiber 23 by the connection unit 22. The optical fiber 21 has excess length and flexure due to excess length and flexure of the optical cable.

The sensor device 10 acquires vibration data of vibration detected by the optical fibers 21 and 23. The vibration data include, in each optical fiber distance of the optical fibers 21 and 23, information representing a temporal change of frequency characteristics of amplitude of vibration. Herein, the optical fiber distance is a length of an optical fiber from a certain reference position. The reference position is, for example, a position where the optical fiber 21 and the sensor device 10 are connected.

The sensor device 10 is a sensor device that transmits probe light being laser light to the optical fiber 21 and detects, based on a phase or the like of reflection return light from each position of the optical fibers 21 and 23, magnitude of vibration in the position. Such a sensor device is publicly known and commercially available, for example, from NEC Platforms Ltd. (product name: SPWV-LS).

As described above, the optical fibers 21 and 21 have excess length and flexure. Therefore, there is a gap between an optical fiber distance in vibration data and a road distance.

The road 40 on which a vehicle such as an automobile travels includes a portion on the bridge 30. It has been empirically understood that vibration data detected by a section of the optical fiber 23 laid in the road 40 on the bridge 30 have characteristics, to be described later, different from vibration data detected by the optical fiber 23 laid in the road 40 other than the bridge 30.

The distance correction method according to the present example embodiment uses a fact that the vibration data are different among sections of the optical fiber 23 laid on the bridge 30 and determines an optical fiber distance of an optical fiber laid on the bridge 30. By using a fact that an optical fiber distance of the optical fiber 23 laid on the bridge 30 is relevant to a road distance of the bridge 30 on map data, each optical fiber distance is corrected, for example, for a range ahead of the bridge 30 when viewed from the sensor device 10. The correction causes an optical fiber distance in a target range to approach a road distance.

Next, it is described how an optical cable laid on a bridge is different from another section in vibration data detected by an optical fiber. FIG. 2 is a diagram illustrating a difference in characteristics of vibration data between an optical cable laid on a bridge and an optical cable laid in a road other than the bridge.

A low frequency range in FIG. 2 is a predetermined range, for example, equal to or less than a certain frequency between 1 and 3 Hz. A lower limit of the low frequency range may be 0 Hz. A high frequency range is a predetermined range, for example, equal to or more than a certain frequency equal to or more than an upper limit of the low frequency range. A lower limit of the high frequency range may be the upper limit of the low frequency range. An upper limit of the high frequency range is desirably a predetermined range equal to or less than a Nyquist frequency. Herein, the Nyquist frequency is referred to as a frequency half of a sampling frequency. Based on a sampling theorem, vibration data equal to or more than the frequency are unreliable and therefore, are not recommended to be included.

When there is no traffic of a vehicle such as an automobile, in both a low frequency range and a high frequency range, amplitude of vibration data is small. The reason is that vibration data are mainly generated when a vehicle travels.

Meanwhile, when there is traffic of a vehicle, amplitude of vibration data in a high frequency range is significantly small in a bridge, compared with another section. The reason is that when vibration is applied, based on travelling of a vehicle, to a bridge, the entire bridge continues vibrating and a change in magnitude of vibration decreases, and therefore when Fourier transformation is performed in a time window of several minutes, vibration in a bridge portion does not substantially include a high frequency component.

Next, by using characteristics of vibration data in FIG. 2, a configuration and processing for performing correction that causes an optical fiber distance to approach a road distance are described.

Figure 3:
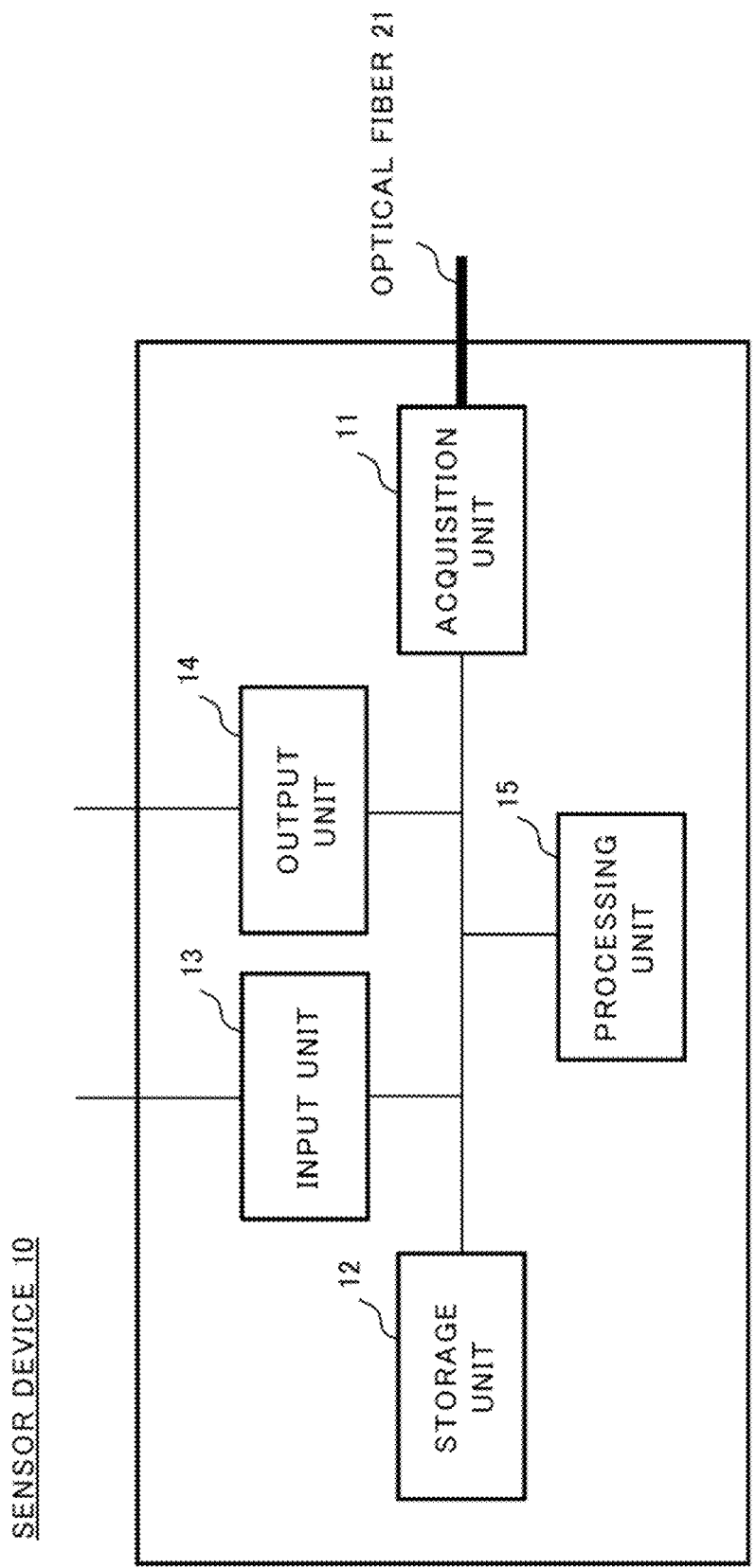
FIG. 3 is a conceptual diagram illustrating a configuration example of a sensor device according to the present example embodiment.

FIG. 3 is a conceptual diagram illustrating a configuration of the sensor device 10 as an example of the sensor device according to the present example embodiment. The sensor device 10 includes an acquisition unit 11, a storage unit 12, an input unit 13, an output unit 14, and a processing unit 15.

The acquisition unit 11 transmits, in accordance with an instruction of the processing unit 15, probe light to the optical fiber 21 and acquires the above-described vibration data from reflection return light from the optical fiber 21 and the optical fiber 23 in FIG. 1 with respect to the probe light. The acquisition unit 11 includes a general sensor device including a commercially available sensor device, and herein detailed description thereof is omitted. The acquisition unit 11 sequentially stores acquired vibration data in the storage unit 12.

The input unit 13 stores, in accordance with an instruction of the processing unit 15, information input from an outside in the storage unit 12. The input unit 13 is, for example, a keyboard, an input unit of a touch panel, a voice input device, or a reception device.

The output unit 14 outputs, in accordance with an instruction of the processing unit 15, information instructed from the processing unit 15 to an outside. The output unit 14 is, for example, a display unit such as a display, a voice output device, or a transmission device.

The processing unit 15 is configured, for example, by including a computer or a processor. In such a case, the processing unit 15 operates, for example, based on a program stored in the storage unit 12.

The processing unit 15 causes, based on input information from an outside, the acquisition unit 11 to acquire vibration data in a predetermined optical fiber distance range. The processing unit 15 further derives various types of information from acquired vibration data and stores the derived information in the storage unit 12. Such processing is processing executed by a general sensor device, and herein description thereof is omitted. The processing unit 15 executes such processing, for example, by using a data processing unit 151 included in the processing unit 15 of FIG. 4.

In addition to the above-described processing, the processing unit identifies an optical fiber distance of a bridge from characteristics of vibration data and executes distance correction processing of causing the optical fiber distance to approach a road distance. The distance correction processing is processing of identifying an optical fiber distance of a bridge from characteristics of vibration data described by referring to FIG. 1 and performing correction by causing the optical fiber distance to approach a road distance. The processing unit 15 executes the distance correction processing, for example, by using a data correction unit 152 included in the processing unit 15 in FIG. 4.

Figure 4:
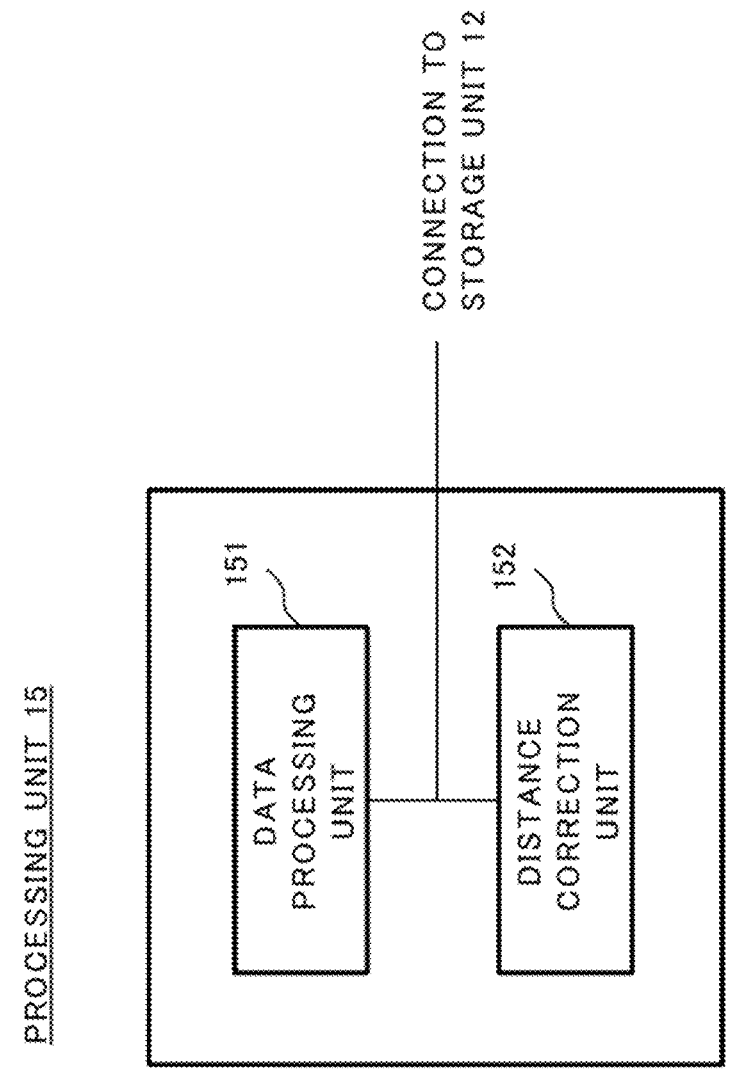
FIG. 4 is a conceptual diagram illustrating a configuration example of a processing unit.
Figure 5:
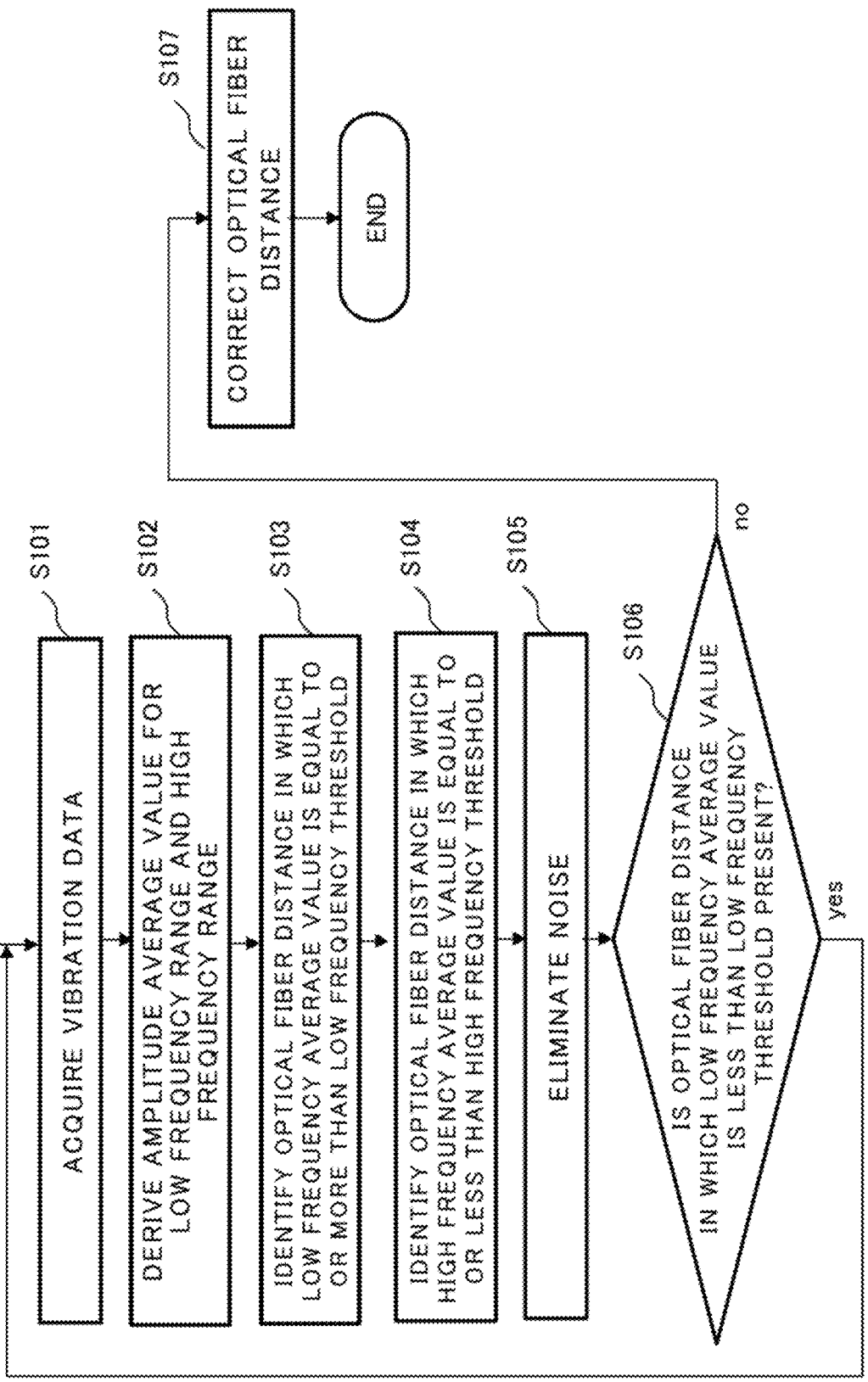
FIG. 5 is a conceptual diagram illustrating a processing flow example of distance correction processing.

FIG. 5 is a conceptual diagram illustrating a processing flow example of distance correction processing executed by the distance correction unit 152 in FIG. 4. The distance correction unit 152 starts processing in FIG. 5, for example, based on input of start information from an outside.

The distance correction unit 152 first instructs, as processing in S101, the acquisition unit 11 in FIG. 3 to acquire vibration data. The vibration data represent, with respect to each time, a value representing magnitude of vibration of each frequency in each optical fiber distance. Upon receiving the instruction, the acquisition unit 11 acquires instructed vibration data.

Figure 6:
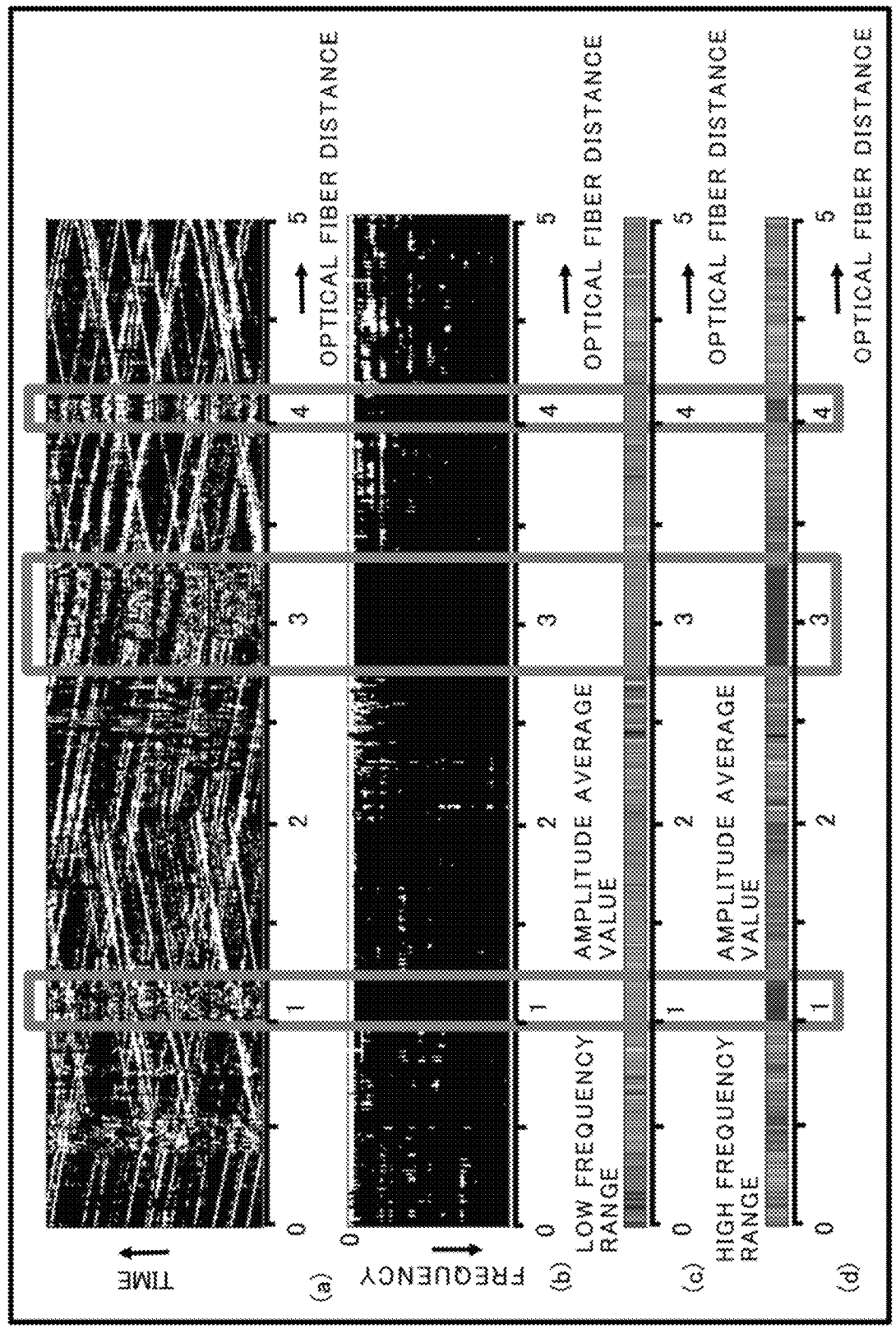
FIG. 6 is a diagram illustrating a specific example of vibration data and an amplitude average value.

Herein, a specific example of the acquired vibration data is described. (a) and (b) in FIG. 6 each are a diagram illustrating a specific example of vibration data. These diagrams each indicate vibration data acquired when a vehicle travels on both a bridge and a road other than the bridge. (a) in FIG. 6 is a diagram illustrating, with respect to each optical fiber distance (horizontal axis), a change based on an elapse of time (vertical axis) of amplitude of vibration. (b) in FIG. 6 is a diagram illustrating, with respect to each optical fiber distance (horizontal axis), a frequency (vertical axis) distribution of a temporal average of amplitude. In (a) and (b) in FIG. 6, brighter dots indicate larger amplitude. In (a) and (b) in FIG. 6, in consideration of visibility for a figure, illustration is made by emphasizing contrast, compared with an actual case.

These pieces of data are acquired by analyzing, by using the acquisition unit 11, return light from the optical fiber included in the optical cable. A configuration that performs such analysis is publicly known, and therefore detailed description thereof is omitted.

In (a) and (b) in FIG. 6, a portion surrounded with a vertically-long rectangle indicates data of an optical fiber distance relevant to a bridge. The data of an optical fiber distance relevant to a bridge is different from peripheral data in a light and dark pattern. Processing of S102 and S103 in FIG. 5 described below is processing of identifying a range of an optical fiber distance relevant to a bridge in which the light and dark pattern is different.

When acquisition of vibration data based on the acquisition unit 11 is completed, the distance correction unit 152 derives, as processing in S102, an amplitude average value of each time and each optical fiber distance, with respect to each of the above-described low frequency range and high frequency range. Herein, the amplitude average value is, for example, in a low frequency range, an average of amplitude in frequencies from a lower limit to an upper limit of the low frequency range.

A low frequency range and a high frequency range are input in advance from an outside and stored in the storage unit 12. The distance correction unit 152 reads a low frequency range and a high frequency range stored in the storage unit 12 and executes processing in S102.

(c) in FIG. 6 is a diagram illustrating, with respect to 999 optical fiber distances (horizontal axis), an amplitude average value (low frequency average value) for a low frequency range. (d) in FIG. 6 is a diagram illustrating, with respect to optical fiber distances (horizontal axis), an amplitude average value (high frequency average value) for a high frequency range. In these diagrams, a color of an optical fiber distance having a lower amplitude average value is indicated with a darker color. In a bridge surrounded with a vertically-long square in (d) in FIG. 6, the color is darker than in a periphery and a high frequency average value is smaller than in the periphery.

Next, the distance correction unit 152 identifies, as processing in S103, an optical fiber distance in which a low frequency average value is equal to or more than a low frequency threshold. Herein, the low frequency threshold is a threshold, for a low frequency average value, determined in advance for processing in S103. The low frequency threshold is determined in advance and stored, for example, in the storage unit 12 in FIG. 3.

The distance correction unit 152 identifies an optical fiber distance in which a high frequency average value is equal to or less than a high frequency threshold. Herein, the high frequency threshold is a threshold, for a high frequency average value, determined in advance for processing in S104. The high frequency threshold is determined in advance and stored, for example, in the storage unit 12 in FIG. 3.

Figure 7:
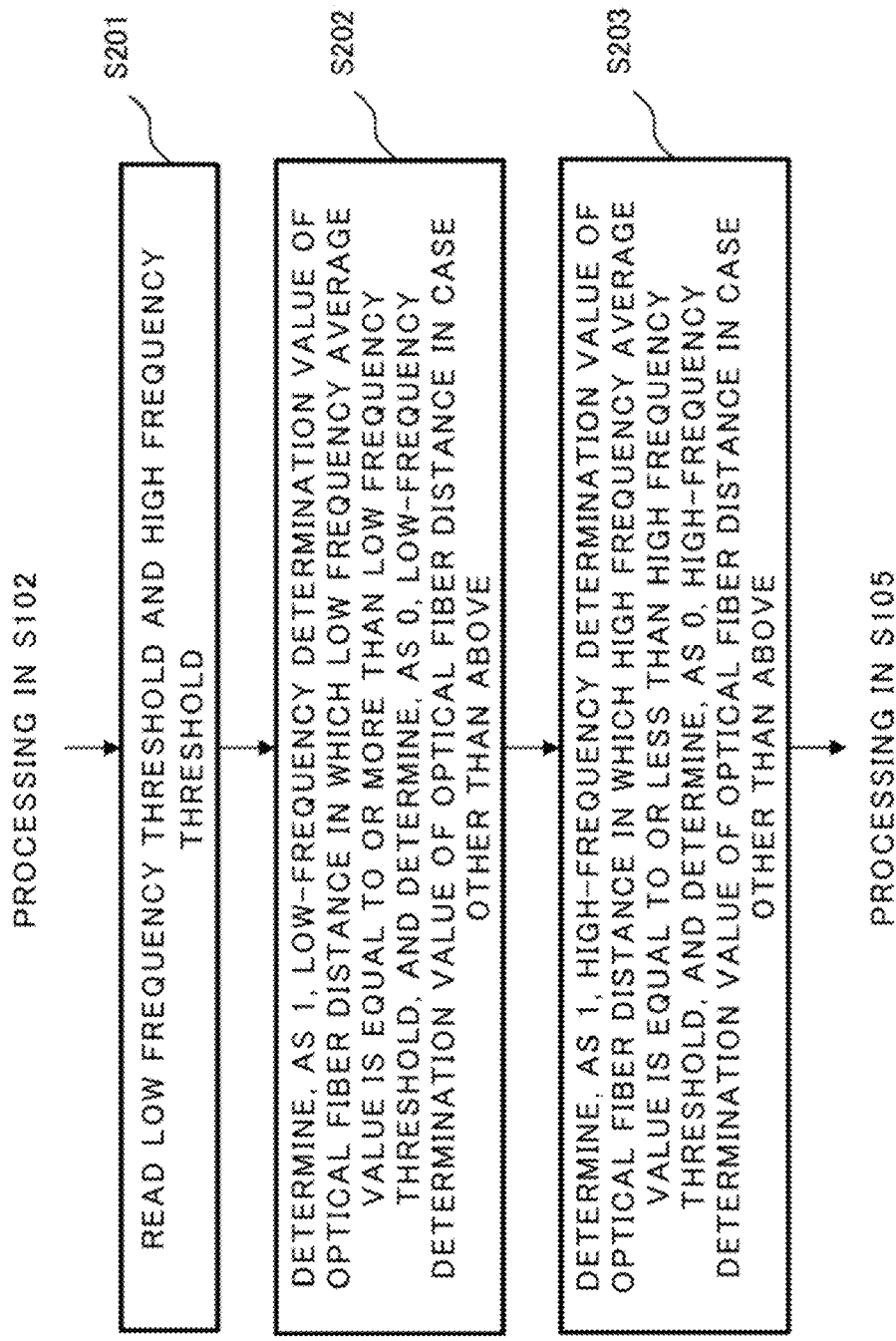
FIG. 7 is a conceptual diagram illustrating a processing flow example of S103 and S104.

The distance correction unit 152 executes processing in S103 and S104, for example, based on processing in FIG. 7. In such a case, upon completion of processing in S102 of FIG. 5, the distance correction unit 152 reads a low frequency threshold and a high frequency threshold from the storage unit 12 in FIG. 3 as processing in S201.

As processing in S202, the distance correction unit 152 determines, as 1, a determination value (low-frequency determination value) of an optical fiber distance in which a low frequency average value is equal to or more than a low frequency threshold. The distance correction unit 152 further determines, as 0, a low-frequency determination value of an optical fiber distance in which a low frequency average value is less than the low frequency threshold.

Next, as processing in S203, the distance correction unit 152 determines, as 1, a determination value (high-frequency determination value) of an optical fiber distance in which a high frequency average value is equal to or less than a high frequency threshold. The distance correction unit 152 further determines, as 0, a high-frequency determination value of an optical fiber distance in which a high frequency average value is more than the high frequency threshold.

The distance correction unit 152 executes processing in S105 in FIG. 5.

Referring back to description of FIG. 5. Subsequently to processing in S104, the distance correction unit 152 executes, as processing in S105, processing of eliminating noise for each of a low-frequency determination value and a high-frequency determination value of each optical fiber distance acquired by the processing in FIG. 4.

Figure 8:
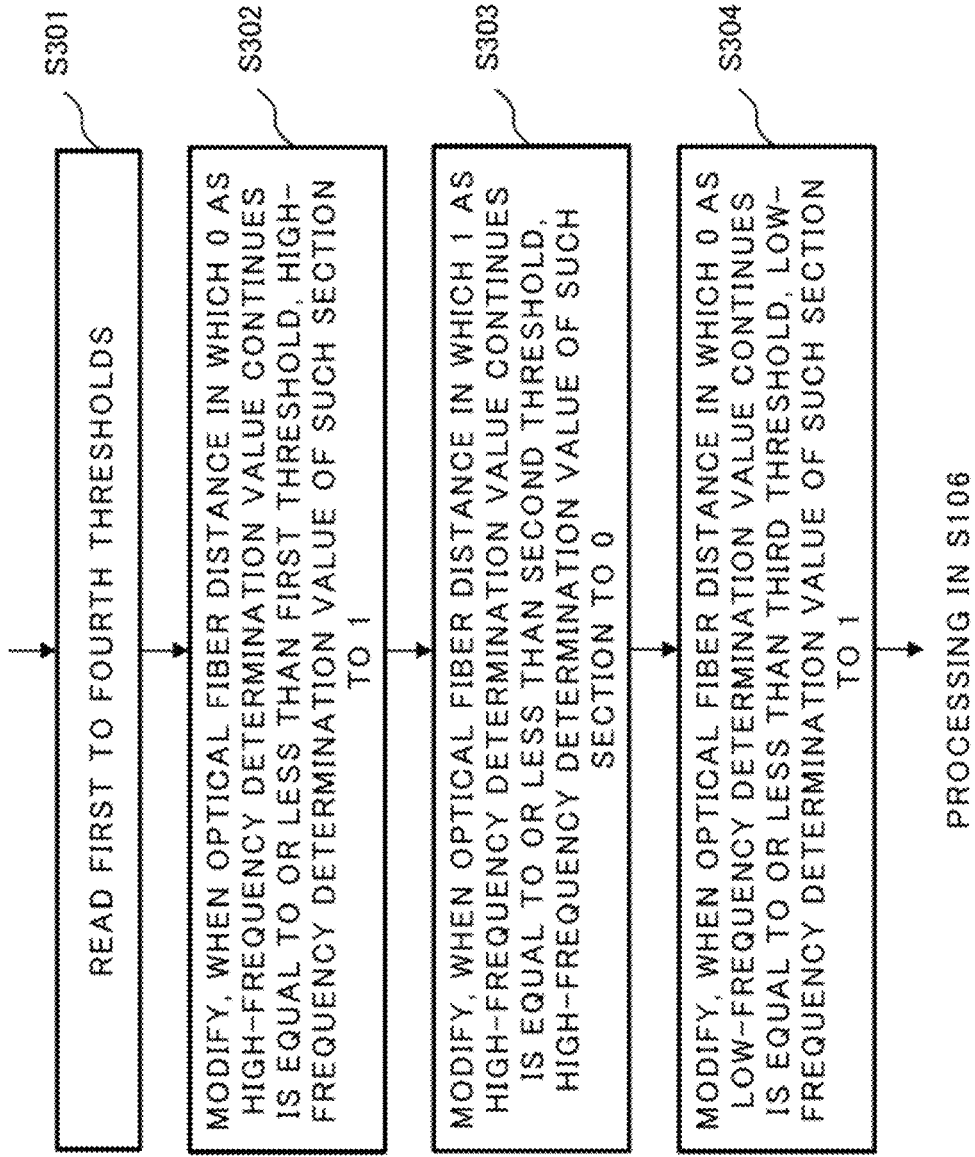
FIG. 8 is a conceptual diagram illustrating a processing flow example of S105.

The distance correction unit 152 executes processing in S105, for example, based on processing in FIG. 8. In such a case, upon completion of processing in FIG. 4, the distance correction unit 152 reads first to fourth thresholds from the storage unit 12 as processing in S301. The first to fourth thresholds each are a threshold for a length of an optical fiber used in the following processing, and are determined in advance and stored, for example, in the storage unit 12.

The distance correction unit 152 modifies, as processing in S302, when a length of an optical fiber in which 0 as a high-frequency determination value continues is equal to or less than the first threshold, a high-frequency determination value in a range of the optical fiber distance to 1. The processing in S302 is processing of modifying, when a length of an optical fiber distance in which 0 (a determination value representing being not a bridge) as a high-frequency determination value continues is significantly short, the high-frequency determination value to 1 (a determination value representing "being a bridge" or "absence of travelling of a vehicle other than a bridge") as noise. The first threshold is set as a value that can be modified in this manner. The first threshold is, for example, several tens of meters (a predetermined value between 50 meters and 100 meters).

It is assumed that, for example, based on a length of a short optical fiber equal to or less than a first threshold in a range of an optical fiber distance of an optical fiber laid on a bridge, 0 as a high-frequency determination value representing being not a bridge is determined as noise. In such a case, the determination result is modified, based on processing of S302, to 1 as a high-frequency determination value representing "being a bridge" or "absence of travelling of a vehicle other than a bridge". As a result, 1 as a high-frequency determination value representing "being a bridge" or "absence of travelling of a vehicle other than a bridge" is assigned to all ranges of the optical fiber distance of the optical fiber laid on the bridge, Next, the distance correction unit 152 modifies, as processing in S303, when a length of an optical fiber distance in which 1 (a determination value representing "being a bridge" or "absence of travelling of a vehicle other than a bridge") as a high-frequency determination value continues is equal to or less than the second threshold, a high-frequency determination value of the section to 0 (a determination value representing being not a bridge). The processing in S303 is processing of modifying, when a length of an optical fiber distance in which 1 (a determination value representing "being a bridge" or "absence of travelling of a vehicle other than a bridge") as a high-frequency determination value continues is significantly short, the high-frequency determination value to 0 (a determination value representing being not a bridge) as noise. The second threshold is set as a value that can be modified in this manner. The second threshold is, for example, approximately 200 meters (a predetermined value equal to or less than 500 meters and preferably between 100 meters and 300 meters). When a length of a bridge is equal to or less than approximately 200 meters, it has been empirically understood that noise easily enter a high-frequency determination value. Based on processing in S304, a high-frequency determination value for a bridge in which such a length is significantly short is as assumed to be 0 representing no relevance to a bridge as a target for subsequent processing. Thereby, a bridge in which noise easily enters a high-frequency determination value is eliminated from targets for the subsequent processing.

Next, the distance correction unit 152 modifies, as processing in S304, when a length of an optical fiber distance in which 0 (a determination value representing absence of travelling of a vehicle) as a low-frequency determination value continues is equal to or less than a third threshold, a low-frequency determination value in the section to 1 (a determination value representing presence of travelling of a vehicle). The processing in S304 is processing of modifying, when a length of an optical fiber distance in which 0 (a determination value representing absence of travelling of a vehicle) as a low-frequency determination value continues is significantly short, the low-frequency determination value to 1 (a determination value representing presence of travelling of a vehicle) as noise. The third threshold is set as a value that can be modified in this manner. The third threshold is, for example, several tens of meters (a predetermined value between 50 meters and 100 meters).

Description of processing in FIG. 8 has been described as above, and a return is made to description of processing in FIG. 5.

Figure 9:
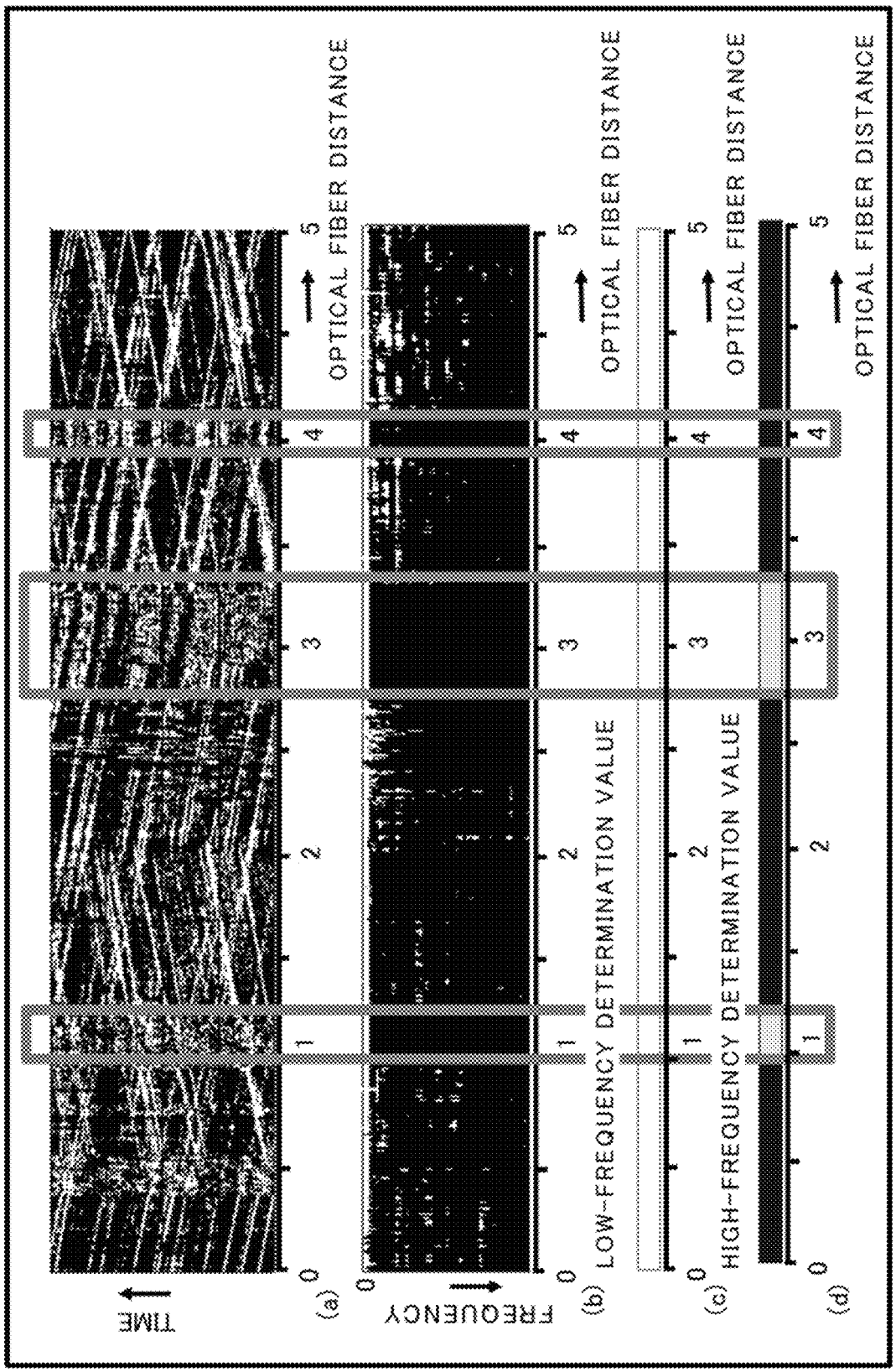
FIG. 9 is a conceptual diagram illustrating an example of a low-frequency determination value and a high-frequency determination value after processing in S105.

(c) and (d) in FIG. 9 each are a conceptual diagram illustrating an example of a low-frequency determination value and a-high frequency determination value of each optical fiber distance after processing in S105 in FIG. 5. (a) and (b) in FIG. 9 each are the same diagram as (c) and (d) in FIG. 9.

In (c) in FIG. 9, a color of a low-frequency determination value of every optical fiber distance is in a bright color. This indicates that a low-frequency determination value of every optical fiber distance is 1. This is relevant to a case where in every optical fiber distance, vibration caused by travelling of a vehicle is regarded as being observed. Herein, the reason for description as "regarded" is that when a low-frequency determination value has a short range of 0 (a determination value representing absence of travelling of a vehicle), based on processing in S105, processing of modifying the low-frequency determination value to 1 (a determination value representing presence of travelling of a vehicle) is executed. Therefore, regarded information is included in data after processing. In the example of (c) in FIG. 9, an optical fiber distance of 0 (a determination value representing absence of travelling of a vehicle) as a low-frequency determination value is not present, but when such an optical fiber distance is present, such optical fiber distance is displayed with a dark color.

In (d) in FIG. 9, a bright-colored portion is relevant to an optical fiber distance of 1 (a determination value representing "being a bridge" or "absence of travelling of a vehicle other than a bridge") as a high-frequency determination value, and a dark-colored portion is relevant to an optical fiber distance of 0 (a determination value representing being not a bridge) as a high-frequency determination value. A range of a bright-colored optical fiber distance is used for the subsequent processing in a range relevant to an optical fiber of an optical cable laid on a bridge. A range surrounded with a rightest vertically-long rectangle is a range of an optical fiber distance in which the optical fiber is laid on the bridge but is not used for the subsequent processing since in (d) in FIG. 9, a high-frequency determination value is 0 (a determination value representing being not a bridge). The reason is that in a bridge having short length in which much noise is present in a high-frequency determination value, a determination value is determined as 0 based on processing in S105 and is not used in the subsequent processing.

Upon termination of processing in S105 in FIG. 5, the distance correction unit 152 determines, as processing in S106 whether there is an optical fiber distance having a low frequency average value less than a low frequency threshold. When a determination result based on the processing in S106 indicates no, the distance correction unit 152 executes processing in S107. When the determination result based on the processing in S106 indicates yes, the distance correction unit 152 executes processing in S101 again. As described with reference to FIG. 2, a range of an optical fiber distance in which amplitude of a low frequency range is significantly small is relevant to a range where vibration caused by travelling of a vehicle is not observed, regardless of whether to be a bridge. When a range of an optical fiber distance in which vibration caused by travelling of a vehicle is not observed is included as a processing target, a result of the subsequent processing may become erroneous. Therefore, when it is determined that there is a range of an optical fiber distance in which vibration caused by travelling of a vehicle is not observed, the distance correction unit 152 executes processing in S101 again and acquires vibration data anew.

In general, vibration data are acquired anew by shifting time, and thereby it is determined, based on processing in S106, that an optical fiber distance having a low frequency average value less than a low frequency threshold is not present. However, in a case of a road in which travelling of a vehicle is very little, it may not always be determined that an optical fiber distance having a low frequency average value less than a low frequency threshold is not present. Such a road is not a target for distance correction according to the present example embodiment. However, usually, such a case is not present in a main road in which an optical cable is laid, except a special case such as vehicle traffic closure.

Note that, when an influence of noise on a processing result in S103 is negligible, the distance correction unit 152 may execute processing in S106 immediately after processing in S103. In such a case, when a determination result based on processing in S106 is yes, the distance correction unit 152 may omit needless execution of processing in S104 and S105.

Further, the distance correction unit 152 may execute, when a determination result based on processing in S106 is yes, processing in S101 and the following steps or S102 and the following steps for only an optical fiber distance range where it is determined, based on processing in S106, that a low frequency average value is less than a low frequency threshold. In such a case, the distance correction unit 152 executes the subsequent processing, by replacing the optical fiber distance range portion of an anterior processing result with a posterior processing result. Thereby, the distance correction unit 152 is able to use an effective portion of the anterior processing result.

The distance correction unit 152 corrects, when executing processing in S107, an optical fiber distance in vibration data in such a way as to approach a road distance as the processing. The correction is, for example, as follows.

Figure 10:
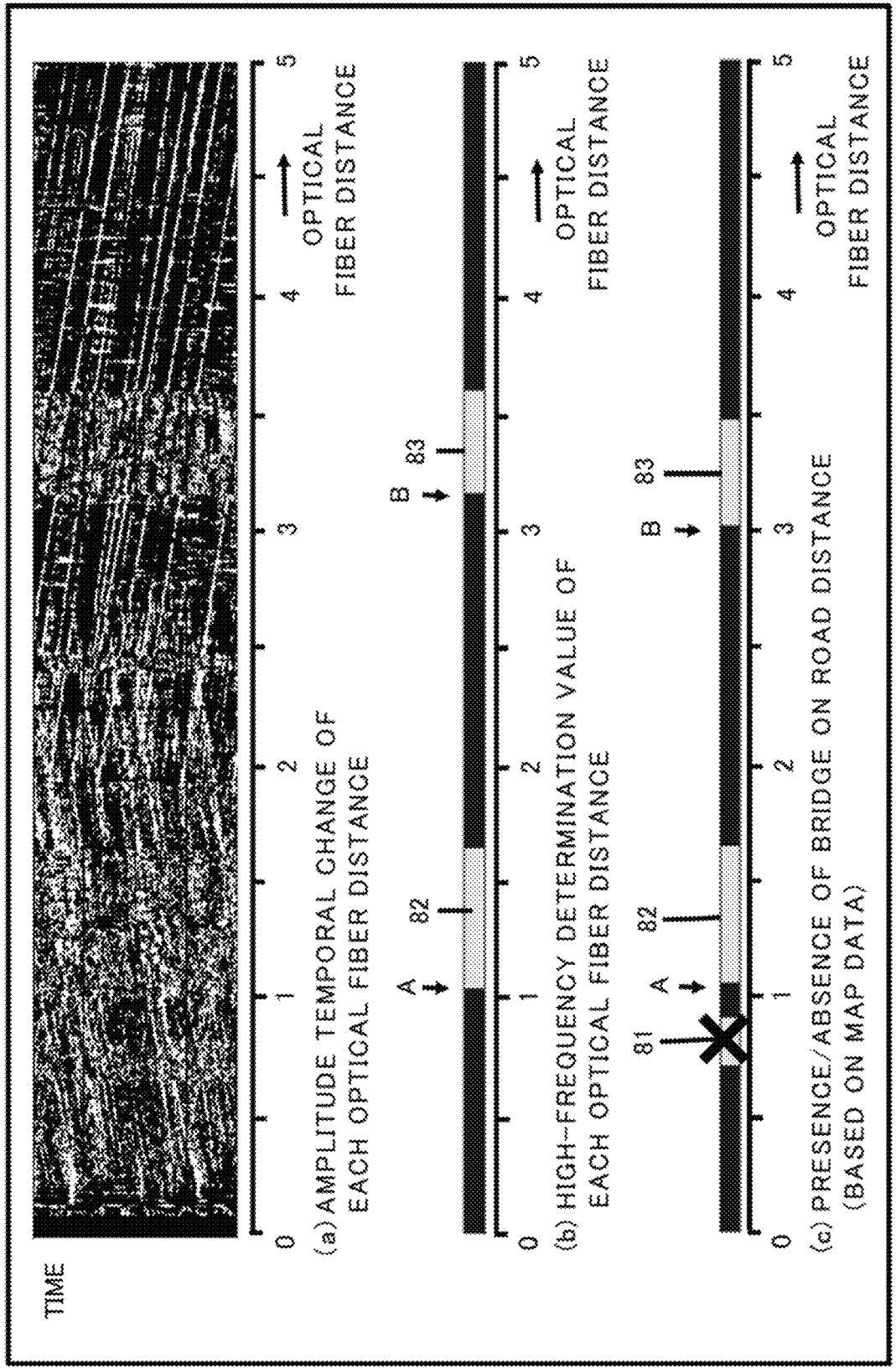
FIG. 10 is an illustrative diagram for describing an example of correction.

It is assumed that, for example, as a high-frequency determination value of each optical fiber distance at a time of executing processing in S107 of FIG. 5, a high-frequency determination value illustrated in (b) in FIG. 10 is acquired. Herein, (a) in FIG. 10 is a diagram being relevant to (b) in FIG. 10, and illustrates a temporal change of amplitude of each optical fiber distance. It is assumed that data representing presence/absence of a bridge on a road distance are illustrated in (c) in FIG. 10.

In (b) in FIG. 10, a range of an optical fiber distance of 1 as a high-frequency determination value relevant to a bridge 81 in (c) in FIG. 10 is not present. The reason is that based on processing in S105 of FIG. 5, with respect to a range of an optical fiber distance of the bridge 81 having short length, 1 as a high-frequency determination value is modified to 0.

Relevantly to a position A where a bridge 82 starts in (b) in FIG. 10, an optical fiber distance in which a high-frequency determination value is switched from 0 to 1 is matched with a road distance of a position A of the bridge 82 in (c) in FIG. 10. This indicates that in an optical fiber distance to the position A, significant excess length or flexure of an optical fiber is not generated.

Meanwhile, relevantly to a position B where a bridge 83 starts in (b) in FIG. 10, an optical fiber distance in which a high-frequency determination value is switched from 0 to 1 is longer than a road distance of a position B of the bridge 83 in (c) in FIG. 10. This indicates that between the positions A and B, significant excess length or flexure of an optical fiber is generated.

In such a case, the distance correction unit 152 corrects an optical fiber distance of the position B in (b) in FIG. 10 in such a way as to be matched with a road distance of the position B in (c) in FIG. 10. Thereby, an optical fiber distance on the right side of the position B in (b) in FIG. 10 is caused to approach a road distance.

Alternatively, the distance correction unit 152 may correct each optical fiber distance from the position A to the position B, for example, by multiplying each optical fiber distance by a length on a road distance between the positions A and B and dividing the multiplied distance by a length on an optical fiber distance between the positions A and B. In such a case, according to where from the position A to the position B flexure and excess length are significantly generated in an optical fiber, a direction deviating from a road distance may be corrected in a certain position between the positions A and B. However, even in such a case, as a whole between the positions A and B (for example, when degrees of deviation are averaged), it is expected that an optical fiber distance is corrected in such a way as to approach a road distance.

Note that, a range of 1 (a determination value representing being a bridge) as a high-frequency determination value in each optical fiber distance and a bridge on a road distance can be associated with each other, for example, by causing the distance correction unit 152 to compare these lengths.

As described above, a high-frequency determination value has been assigned with two values including 0 and 1. However, for the high-frequency determination value, a combination of other two values may be used. The same applies to a low-frequency determination value.

As values representing amplitude of vibration of a high frequency range and a low frequency range, a high frequency average value and a low frequency average value have been used. However, as values representing amplitude of vibration of a high frequency range and a low frequency range, values other than a high frequency average value and a low frequency average value may be used.

As a value representing magnitude of vibration, a value other than a value representing amplitude of vibration may be used. As a value representing magnitude of vibration, for example, a value representing intensity of vibration may be used.

Advantageous Effect

The sensor device according to the present example embodiment derives an optical fiber distance of a bridge, by using a fact that characteristics of vibration data detected by an optical fiber are different between characteristics of an optical cable laid on a bridge and characteristics of an optical cable laid in another portion of a road. The sensor device corrects, based on a road distance of a bridge on map data and an optical fiber distance of the bridge, each optical fiber distance to the bridge.

Therefore, the sensor device does not require complex work for referring to a plurality pieces of data such as structure information of a road and map information. Therefore, the sensor device facilitates improvement of accuracy of identifying a position, on a road, of vibration caused by a vehicle and detected by an optical cable.

Figure 11:
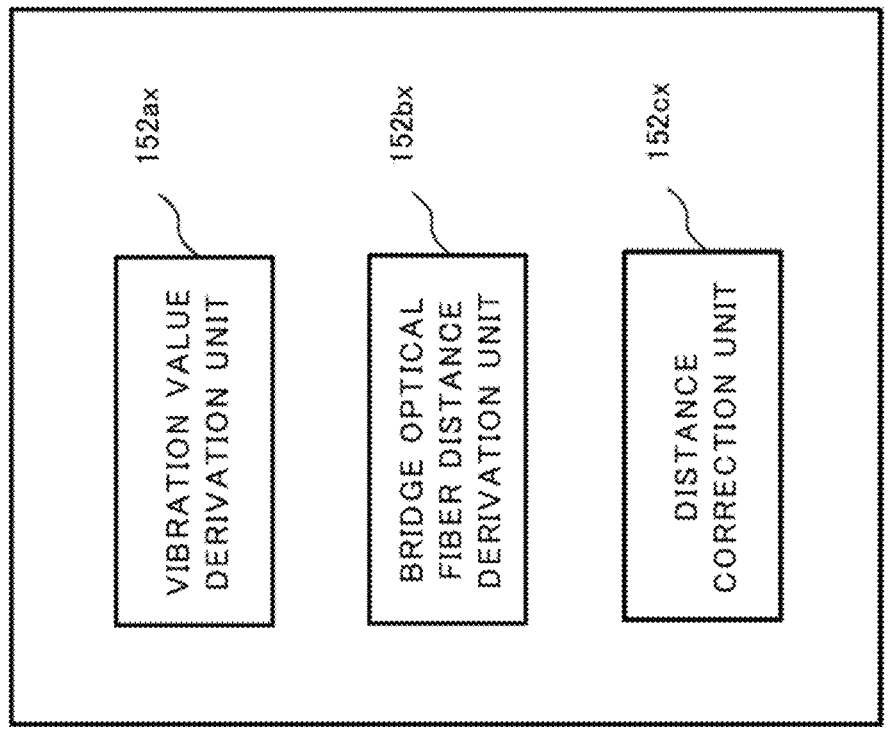
FIG. 11 is a block diagram illustrating a minimum configuration of a distance correction device according to the example embodiment.

FIG. 11 is a block diagram illustrating a configuration of a distance correction device 152x being a minimum configuration of the distance correction device according to the example embodiment. The distance correction device 152x includes a vibration value derivation unit 152ax, a bridge optical fiber distance derivation unit 152bx, and a distance correction unit 152cx.

The vibration value derivation unit 152ax derives a first vibration value from vibration data, detected by an optical fiber installed along a road on which a vehicle travels, with respect to each optical fiber distance being a length from a reference point of the optical fiber. Herein, the vibration data are data representing magnitude of vibration. The first vibration value is a value representing magnitude of vibration of a first frequency range being a predetermined frequency range with respect to each of the optical fiber distances.

The bridge optical fiber distance derivation unit 152bx derives, from the first vibration value, a bridge optical fiber distance being the optical fiber distance from the reference point to a bridge optical fiber position which is a predetermined position on the optical fiber installed on the bridge.

The distance correction unit 152cx corrects the optical fiber distance in a predetermined range, based on the bridge optical fiber distance and a road distance being a distance along the road from the reference point to the bridge optical fiber position. This correction causes the optical fiber distance to approach the road distance.

The distance correction device 152x performs the correction, based on the configuration described above. Therefore, the distance correction device 152x enables the correction without referring to a plurality of pieces of data such as structure information of a road and map information. When an optical fiber distance can be caused to approach the road distance in the optical fiber position of the optical fiber distance, accuracy of identifying a position, on a road, of vibration caused by a vehicle and detected by an optical cable is improved. Therefore, the distance correction device 152x facilitates accuracy of identifying a position, on a road, of vibration caused by a vehicle and detected by an optical cable.

Therefore, the distance correction device 152x exhibits, based on the configuration, the advantageous effect described in Advantageous Effects of Invention.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

The whole or part of the example embodiments disclosed above can be described as, but not limited to, the following supplementary notes.

(Supplementary Note 1)

A distance correction device including:
a vibration value derivation means for deriving, from vibration data being data representing magnitude of vibration detected by an optical fiber installed along a road on which a vehicle travels, for each optical fiber distance being a length from a reference point of the optical fiber, a first vibration value being a value representing magnitude of vibration in a first frequency range being a predetermined frequency range for each of the optical fiber distances;
a bridge optical fiber distance derivation means for deriving, from the first vibration value, a bridge optical fiber distance being the optical fiber distance from the reference point to a bridge optical fiber position being a predetermined position of the optical fiber installed on a bridge; and
a distance correction means for correcting, based on the bridge optical fiber distance and a road distance being a distance along the road from the reference point to the bridge optical fiber position, the optical fiber distance in a predetermined range in such a way as to approach the road distance.

(Supplementary Note 2)

The distance correction device according to supplementary note 1, wherein the first frequency range is the frequency range equal to or more than a predetermined frequency between 1 Hz and 3 Hz.

(Supplementary Note 3)

The distance correction device according to supplementary note 1, wherein the first frequency range is the frequency range equal to or more than 1 Hz.

(Supplementary Note 4)

The distance correction device according to any one of supplementary notes 1 to 3, wherein the bridge optical fiber distance derivation means derives the bridge optical fiber distance, based on derivation of the optical fiber distance in which the first vibration value significantly changes.

(Supplementary Note 5)

The distance correction device according to supplementary note 4, wherein the change is a decrease.

(Supplementary Note 6)

The distance correction device according to any one of supplementary notes 1 to 5, wherein a value representing magnitude of the vibration is a value representing amplitude of the vibration or a value representing intensity of the vibration.

(Supplementary Note 7)

The distance correction device according to any one of supplementary notes 1 to 6, wherein a value representing magnitude of the vibration in the first frequency range is an average value of values representing magnitude of the vibration in frequencies from a lower limit to an upper limit of the first frequency range.

(Supplementary Note 8)

The distance correction device according to any one of supplementary notes 1 to 7, wherein the vibration value derivation means derives, for each of the optical fiber distances, a first determination value being a determination result of whether the first vibration value is equal to or less than a first vibration value threshold being a threshold for the first vibration value.

(Supplementary Note 9)

The distance correction device according to supplementary note 8, wherein the first determination value is either of predetermined two values, the distance correction device further including a first modification means for executing first modification processing of modifying, in a range of the optical fiber distance of the optical fiber laid on the bridge, a value representing being not the bridge between the two values to a value representing being the bridge between the two values.

(Supplementary Note 10)

The distance correction device according to supplementary note 9, wherein the first modification means executes the first modification processing, by modifying, when a range of the optical fiber distance where one of the two values continues is equal to or less than a first threshold, the one of the two values in the range to another value of the two values.

(Supplementary Note 11)

The distance correction device according to supplementary note 10, wherein the first threshold is a predetermined value between 50 meters and 100 meters.

(Supplementary Note 12)

The distance correction device according to any one of supplementary notes 9 to 11, further including a second modification means for executing, after the first modification processing, second modification processing of modifying the first determination value in a range of the optical fiber distance of the optical fiber laid on the bridge being shorter than a second threshold, to the value representing being not the bridge between the two values.

(Supplementary Note 13)

The distance correction device according to supplementary note 12, wherein the second modification means executes the second modification processing, by modifying, when a range of the optical fiber distance where the value representing being not the bridge between the two values continues is equal to or less than the second threshold, the value representing being not the bridge in the range to the value representing being the bridge.

(Supplementary Note 14)

The distance correction device according to supplementary note 12 or 13, wherein the second threshold is a predetermined value equal to or less than 500 meters.

(Supplementary Note 15)

The distance correction device according to supplementary note 12 or 13, wherein the second threshold is a predetermined value between 150 meters and 250 meters.

(Supplementary Note 16)

The distance correction device according to any one of supplementary notes 1 to 15, wherein the bridge optical fiber position is a position where the optical fiber distance of the optical fiber laid on the bridge is shortest.

(Supplementary Note 17)

The distance correction device according to any one of supplementary notes 1 to 16, further including:
  a second vibration value derivation means for deriving a second vibration value being a value representing magnitude of vibration in a second frequency range of a frequency lower than the first frequency range: and
  a determination means for determining, based on the second vibration value, whether to cause the distance correction means to perform the correction.

(Supplementary Note 18)

The distance correction device according to supplementary note 17, wherein the second vibration value derivation means derives, for each of the optical fiber distances, a second determination value being a determination result of whether the second vibration value is equal to or less than a second vibration value threshold being a threshold for the second vibration value.

(Supplementary Note 19)

The distance correction device according to supplementary note 18, wherein the second determination value is either of two values, the distance correction device further including a third modification means for executing third modification processing of modifying, when a range of the optical fiber distance where a value representing absence of travelling of the vehicle between the two values continues is equal to or more than a third threshold, the value representing absence of travelling of the vehicle in the range to a value representing presence of travelling of the vehicle.

(Supplementary Note 20)

The distance correction device according to supplementary note 19, wherein the determination means causes the distance correction means to perform the correction when, in a target range of the optical fiber distance, the second determination value after the third modification processing indicates only the value representing presence of travelling of the vehicle between the two values.

(Supplementary Note 21)

A processing device including:
  the distance correction device according to any one of supplementary notes 1 to 20; and
  a processing means for executing predetermined processing for the vibration data, based on the corrected optical fiber distance.

(Supplementary Note 22)

A sensor device including:
  the processing device according to supplementary note 21; and
  an acquisition means for acquiring the vibration data.

(Supplementary Note 23)

A distance correction method including:
  deriving, from vibration data being data representing magnitude of vibration detected by an optical fiber installed along a road on which a vehicle travels, for each optical fiber distance being a length from a reference point of the optical fiber, a first vibration value being a value representing magnitude of vibration in a first frequency range being a predetermined frequency range for each of the optical fiber distances;
  deriving, from the first vibration value, a bridge optical fiber distance being the optical fiber distance from the reference point to a bridge optical fiber position being a predetermined position of the optical fiber installed on a bridge; and
  correcting, based on the bridge optical fiber distance and a road distance being a distance along the road from the reference point to the bridge optical fiber position, the optical fiber distance in a predetermined range in such a way as to approach the road distance.

(Supplementary Note 24)

A recording medium recording a distance correction program causing a computer to execute:
  processing of deriving, from vibration data being data representing magnitude of vibration detected by an optical fiber installed along a road on which a vehicle travels, for each optical fiber distance being a length from a reference point of the optical fiber, a first vibration value being a value representing magnitude of vibration in a first frequency range being a predetermined frequency range for each of the optical fiber distances;
  processing of deriving, from the first vibration value, a bridge optical fiber distance being the optical fiber distance from the reference point to a bridge optical fiber position being a predetermined position of the optical fiber installed on a bridge; and
  processing of correcting, based on the bridge optical fiber distance and a road distance being a distance along the road from the reference point to the bridge optical fiber position, the optical fiber distance in a predetermined range in such a way as to approach the road distance.

Herein, according to the supplementary notes, the "road" is, for example, the road 40 in FIG. 1. The "optical fiber" is, for example, the optical fiber 21 or 23 in FIG. 1. The "reference point" is, for example, a point between the sensor device 10 and the optical fiber 21 in FIG. 1. The "first frequency range" is, for example, the above-described high frequency range.

The "vibration value derivation means" is, for example, a portion for executing processing in S102 of FIG. 5 included in the distance correction unit 152 of FIG. 4. The "bridge" is, for example, the bridge 30 in FIG. 1. The "bridge optical fiber position" is, for example, a position of any one of portions, laid on the bridge 30, of the optical fiber 23 in FIG. 1.

The "bridge optical fiber distance derivation means" is, for example, a portion for executing processing in S103, S104, and S105 in FIG. 5 and a portion for deriving the bridge optical fiber distance when executing processing in S107 included in the distance correction unit 152 of FIG. 4. The "distance correction means" is, for example, a portion for executing processing in S107 of FIG. 5 included in the distance correction unit 152 of FIG. 4.

The "distance correction device" is, for example, the distance correction unit 152 in FIG. 4. The "value representing being not a bridge" is, for example, 0 as the above-described high-frequency determination value. The "value representing being a bridge" is, for example, 1 as the above-described high-frequency determination value. The "first modification means" is, for example, a portion for executing processing in S302 of FIG. 8 included in the distance correction unit 152 of FIG. 4

The "second modification means" is, for example, a portion for executing processing in S303 of FIG. 8 included in the distance correction unit 152 of FIG. 4. The "position where an optical fiber distance is shortest" is, for example, the position A or B in FIG. 10 or the position D in FIG. 11. The "second vibration value derivation means" is, for example, a portion for executing processing in S103 of FIG. 5 included in the distance correction unit 152 of FIG. 4.

The "determination means" is, for example, a portion for executing processing in S106 of FIG. 5 included in the distance correction unit 152 of FIG. 4. The "third correction means" is, for example, a portion for executing processing in S304 of FIG. 8 included in the distance correction unit 152 of FIG. 4. The "processing device" is, for example, the processing unit 15 in FIG. 3 or 4.

The "sensor device" is, for example, the sensor device 10 in FIG. 1 or 3. The "distance correction method" is, for example, a method executed by the distance correction unit 152 in FIG. 4. The "computer" is, for example, a computer that includes or is included in the distance correction unit 152 in FIG. 4. The "distance correction program" is, for example, a program for causing the computer to execute processing.

REFERENCE SIGNS LIST

10 Sensor device
11 Acquisition unit
12 Storage unit
13 Input unit
14 Output unit
15 Processing unit
151 Data processing unit
152 Distance correction unit
152x Distance correction device
152ax Vibration value derivation unit
152bx Bridge optical fiber distance derivation unit
152cx Distance correction unit
21, 23 Optical fiber
22 Connection unit
81, 82, 83, 84, 85 Bridge
40 Road

What is claimed is:

1. A distance correction device comprising:
   a vibration value derivation circuit configured to derive, from vibration data being data representing magnitude of vibration detected by an optical fiber installed along a road on which a vehicle travels, for each optical fiber distance being a length from a reference point of the optical fiber, a first vibration value being a value representing magnitude of vibration in a first frequency range being a predetermined frequency range for each of the optical fiber distances;
   a bridge optical fiber distance derivation circuit configured to derive, from the first vibration value, a bridge optical fiber distance being the optical fiber distance from the reference point to a bridge optical fiber position being a predetermined position of the optical fiber installed on a bridge; and
   a distance correction circuit configured to correct, based on the bridge optical fiber distance and a road distance being a distance along the road from the reference point to the bridge optical fiber position, the optical fiber distance in a predetermined range in such a way as to approach the road distance.

2. The distance correction device according to claim 1, wherein the first frequency range is the frequency range equal to or more than a predetermined frequency between 1 Hz and 3 Hz.

3. The distance correction device according to claim 1, wherein the first frequency range is the frequency range equal to or more than 1 Hz.

4. The distance correction device according to claim 1, wherein the bridge optical fiber distance derivation circuit derives the bridge optical fiber distance, based on derivation of the optical fiber distance in which the first vibration value significantly changes.

5. The distance correction device according to claim 4, wherein the change is a decrease.

6. The distance correction device according to claim 1, wherein a value representing magnitude of the vibration is a value representing amplitude of the vibration or a value representing intensity of the vibration.

7. The distance correction device according to claim 1, wherein a value representing magnitude of the vibration in the first frequency range is an average value of values representing magnitude of the vibration in frequencies from a lower limit to an upper limit of the first frequency range.

8. The distance correction device according to claim 1, wherein the vibration value derivation circuit derives, for each of the optical fiber distances, a first determination value being a determination result of whether the first vibration value is equal to or less than a first vibration value threshold being a threshold for the first vibration value.

9. The distance correction device according to claim 8, wherein the first determination value is either of predetermined two values, the distance correction device further comprising a first modification circuit configured to execute first modification processing of modifying, in a range of the optical fiber distance of the optical fiber laid on the bridge, a value representing being not the bridge between the two values to a value representing being the bridge between the two values.

10. The distance correction device according to claim 9, wherein the first modification circuit executes the first modification processing, by modifying, when a range of the optical fiber distance where one of the two values continues is equal to or less than a first threshold, the one of the two values in the range to another value of the two values.

11. The distance correction device according to claim 10, wherein the first threshold is a predetermined value between 50 meters and 100 meters.

12. The distance correction device according to claim 9, further comprising a second modification circuit configured to execute, after the first modification processing, second modification processing of modifying the first determination value in a range of the optical fiber distance of the optical fiber laid on the bridge being shorter than a second threshold, to the value representing being not the bridge between the two values.

13. The distance correction device according to claim 12, wherein the second modification circuit executes the second modification processing, by modifying, when a range of the optical fiber distance where the value representing being not the bridge between the two values continues is equal to or less than the second threshold, the value representing being not the bridge in the range to the value representing being the bridge.

14. The distance correction device according to claim 12, wherein the second threshold is a predetermined value equal to or less than 500 meters.

15. The distance correction device according to claim 1, wherein the bridge optical fiber position is a position where the optical fiber distance of the optical fiber laid on the bridge is shortest.

16. The distance correction device according to claim 1, further comprising:
a second vibration value derivation circuit configured to derive a second vibration value being a value representing magnitude of vibration in a second frequency range of a frequency lower than the first frequency range; and
a determination circuit configured to determine, based on the second vibration value, whether to cause the distance correction circuit to perform the correction.

17. The distance correction device according to claim 16, wherein the second vibration value derivation circuit derives, for each of the optical fiber distances, a second determination value being a determination result of whether the second vibration value is equal to or less than a second vibration value threshold being a threshold for the second vibration value.

18. The distance correction device according to claim 17, wherein the second determination value is either of two values, the distance correction device further comprising a third modification circuit configured to execute third modification processing of modifying, when a range of the optical fiber distance where a value representing absence of travelling of the vehicle between the two values continues is equal to or more than a third threshold, the value representing absence of travelling of the vehicle in the range to a value representing presence of travelling of the vehicle.

19. The distance correction device according to claim 18, wherein the determination circuit causes the distance correction circuit to perform the correction when, in a target range of the optical fiber distance, the second determination value after the third modification processing indicates only the value representing presence of travelling of the vehicle between the two values.

20. A distance correction method comprising:
deriving, from vibration data being data representing magnitude of vibration detected by an optical fiber installed along a road on which a vehicle travels, for each optical fiber distance being a length from a reference point of the optical fiber, a first vibration value being a value representing magnitude of vibration in a first frequency range being a predetermined frequency range for each of the optical fiber distances;
deriving, from the first vibration value, a bridge optical fiber distance being the optical fiber distance from the reference point to a bridge optical fiber position being a predetermined position of the optical fiber installed on a bridge; and
correcting, based on the bridge optical fiber distance and a road distance being a distance along the road from the reference point to the bridge optical fiber position, the optical fiber distance in a predetermined range in such a way as to approach the road distance.

* * * * *